(12) United States Patent
Pucci et al.

(10) Patent No.: US 10,522,919 B2
(45) Date of Patent: Dec. 31, 2019

(54) SURFACE INTEGRATED WAVEGUIDE ANTENNA AND A TRANSCEIVER INCLUDING A SURFACE INTEGRATED WAVEGUIDE ANTENNA ARRAY

(71) Applicant: TELEFONAKTIEBOLAGET LM ERICSSON (PUBL), Stockholm (SE)

(72) Inventors: Elena Pucci, Stockholm (SE); Leonard Rexberg, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 42 days.

(21) Appl. No.: 15/569,212

(22) PCT Filed: May 7, 2015

(86) PCT No.: PCT/SE2015/050513
§ 371 (c)(1),
(2) Date: Oct. 25, 2017

(87) PCT Pub. No.: WO2016/178609
PCT Pub. Date: Nov. 10, 2016

(65) Prior Publication Data
US 2018/0108969 A1    Apr. 19, 2018

(51) Int. Cl.
| | | |
|---|---|---|
| *H01Q 13/02* | (2006.01) | |
| *H01Q 1/52* | (2006.01) | |
| *H01Q 21/00* | (2006.01) | |
| *H01P 3/12* | (2006.01) | |
| *H04B 7/26* | (2006.01) | |

(52) U.S. Cl.
CPC ............ *H01Q 13/02* (2013.01); *H01P 3/121* (2013.01); *H01Q 1/521* (2013.01); *H01Q 21/0093* (2013.01); *H01Q 13/0283* (2013.01); *H04B 7/26* (2013.01)

(58) Field of Classification Search
CPC ........ H01P 3/121; H01Q 13/02; H01Q 13/06; H01Q 13/24; H01Q 1/3233
USPC .......................................................... 333/248
See application file for complete search history.

(56) References Cited

U.S. PATENT DOCUMENTS

| | | | |
|---|---|---|---|
| 9,350,063 B2 * | 5/2016 | Herbsommer et al. ... | H01P 3/16 |
| 2009/0066597 A1 * | 3/2009 | Yang et al. ............. | H01P 3/121 |
| | | | 343/771 |

FOREIGN PATENT DOCUMENTS

CN    103022668 A    4/2013

OTHER PUBLICATIONS

Deslandes et al., "Integrated Microstrip and Rectangular Waveguide in Planar Form," IEEE Microwave and Wireless Components Letters, Feb. 2001, vol. 11, No. 2.
(Continued)

*Primary Examiner* — Benny T Lee
(74) *Attorney, Agent, or Firm* — Patent Portfolio Builders PLLC

(57) ABSTRACT

A substrate integrated waveguide, SIW, antenna comprises a modified design of prior art SIW antennas that comprises an addition of electrically conducting means, e.g. vias, also along the substrate extending from the antenna aperture. By doing so, the SIW antenna of the present disclosure enables a reduction of mutual coupling between neighboring SIW antennas when arranged adjacent each other, e.g. in an array. Moreover, a reduction of back radiation in the SIW antenna can also be observed.

9 Claims, 7 Drawing Sheets

(56) References Cited

OTHER PUBLICATIONS

Esquius-Morote et al., "A Printed Transition for Matching Improvement of SIW Horn Antennas," IEEE on Antennas and Transactions Propagation, Apr. 2013, vol. 61, No. 4.
Esquius-Morote et al., "Novel Thin and Compact H-Plane SIW Horn Antenna," IEEE Transactions on Antennas and Propagation, Jun. 2013, vol. 61, No. 6.
Hirokawa et al., "Single-Layer Feed Waveguide Consisting of Posts for Plane TEM Wave Excitation in Parallel Plates," IEEE Transactions on Antennas and Propagation, May 1998, vol. 46, No. 5.
International Search Report and Written Opinion dated Jan. 26, 2016 in related International Application No. PCT/SE2015/050513.
Wang et al., "A Planar Feeding Technology Using Phase-and-Amplitude-Corrected SIW Horn and its Application," IEEE Antennas and Wireless Propagation Letters, Sep. 2015, vol. 14.
Wang et al., Dielectric Loaded Substrate Integrated Waveguide (SIW) H-Plane Horn Antennas, IEEE Transactions on Antennas and Propagation, Mar. 2010, vol. 58, No. 3.
Zhao et al., "Wideband and Low-Profile H-Plane Ridged SIW Horn Antenna Mounted on a Large Conducting Plane," IEEE Transactions on Antennas and Propagation, Nov. 2014, vol. 62, No. 11.

\* cited by examiner

SURFACE INTEGRATED WAVEGUIDE ANTENNA AND A TRANSCEIVER INCLUDING A SURFACE INTEGRATED WAVEGUIDE ANTENNA ARRAY

TECHNICAL FIELD

Embodiments herein relate to a substrate integrated waveguide, SIW, antenna, an array of such antennas and a transceiver comprising such an antenna array.

BACKGROUND

Wireless communication systems, i.e. systems that provide communication services to wireless communication devices such as mobile phones, smartphones etc., have evolved during the last decade into systems that must utilize the radio spectrum in the most efficient manner possible. A reason for this is the ever increasing demand for high speed data communication capabilities in terms of, e.g., bit rate. In order to realize such systems, much effort has been spent in developing both software and hardware components that can provide these capabilities. One vital hardware component that is needed in all radio communicating arrangements is an antenna, and in many implementation scenarios a compact and simple antenna construction is desirable.

Substrate integrated waveguides, SIW, realize planar rectangular waveguides in printed technology by using a thin substrate material covered by metal plates on its top and bottom surfaces. Via holes or via posts on each side act as walls to create the waveguide. When the diameters of the vias and their period are chosen properly as to emulate a perfect metallic wall, the well-known dispersion relations of the rectangular waveguide will become a good approximation for the dispersion performance of the SIW. It is well-known how to design the vias in SIWs. Its compact and low profile characteristics are very attractive toward the current tendency to use the mm-wave radio spectrum for wireless communication and to integrate radio frequency, RF, components and antennas in compact and small modules.

A SIW antenna can be realized using printed circuit board, PCB, technology. In particular, the so-called SIW horn antenna has been introduced for application requiring end-fire radiation, i.e., antennas whose maximum radiation is in the direction parallel to their axis. Such a prior art SIW horn antenna 100 is schematically illustrated in a perspective view in FIG. 1. The SIW horn antenna 100 comprises a substrate 102, e.g. part of a PCB, covered on a top surface by a first metal plate 104 and on a bottom surface by a bottom metal plate 106. Vias 108 connect the top and bottom plates 104, 106 and the vias 108 are arranged in a flared configuration in the x/y directions from an input end 110 and terminate in an aperture 112 as FIG. 1 illustrates with reference to an xyz coordinate system.

By extending the substrate 102 beyond the antenna aperture 112 in the direction of extension, y, as shown in FIG. 1, a narrower beam width can be reached in the E-plane (i.e. in the z-direction indicated in FIG. 1), thus increasing the overall antenna directivity. However, the SIW horn performance, such as bandwidth and front-to-back ratio, FTBR, is strongly affected when the substrate thickness is much smaller than the wavelength mainly due to the mismatch at the dielectric-air interface, which usually is the case for SIW structures. This effect is clear at frequencies below 20 GHz, where commercial substrates have substrate thicknesses on the order of $\lambda_o/10$ (i.e. ⅒ of the wavelength). It has been shown that the performance of the SIW horn can be improved by adding a transition made of parallel plates 116,118 and 120,122 to the substrate 102 beyond the aperture 112, as illustrated in FIG. 1. The advantage of using such a SIW horn antenna is the ability to form the wanted polarization along the z-direction while conforming to a flat brick-oriented solution which at the same time is broadband. This flat-brick-oriented solution is described, e.g., by Marc Esquius-Morote, Benjamin Fuchs, Jean-François Zürcher, and Juan R. Mosig in "*Novel Thin and Compact H-Plane SIW Horn Antenna*", IEEE Transactions on Antennas and Propagation, vol. 61, no. 6, pp. 2911-2920, June 2013.

However, a drawback related to SIW horn antennas, including such SIW antennas described above, is the considerable high mutual coupling between neighboring elements when they are placed side by side in an array. In order to avoid visible grating lobes from an antenna array, i.e. unwanted beams which will radiate in other directions, the distance between each antenna element must be equal or smaller than half a wavelength. This limitation in space, plus the need for a compact design, forces the antenna elements to be adjacent to each other producing large mutual coupling.

BRIEF SUMMARY OF EMBODIMENTS OF THE INVENTION

In view of the above, an object of the present disclosure is to overcome or at least mitigate at least some of the drawbacks related to prior art SIW antennas and SIW antenna arrays.

This is achieved in a first aspect by a substrate integrated waveguide, SIW, antenna. The SIW antenna comprises a substrate, a first metal plate arranged on a first side of the substrate and a second metal plate arranged on a second side of the substrate. First electrically conducting means are arranged through the substrate to connect the first metal plate and the second metal plate. The first electrically conducting means are arranged in a direction of extension, starting at a feed end and ending at an aperture. The SIW antenna further comprises second electrically conducting means that are arranged through the substrate. The second electrically conducting means start at the aperture and are arranged in the direction of extension.

In other words, a SIW antenna of the present disclosure comprises a modified design of prior art SIW antennas that comprises an addition of electrically conducting means, e.g. vias, also along the substrate extending from the antenna aperture. By doing so, the SIW antenna of the present disclosure enables a reduction of mutual coupling between neighboring SIW antennas when arranged adjacent each other. Moreover, a reduction of back radiation in the SIW antenna can also be observed. For embodiments of such SIW antennas, the design may be kept simple and easy to realize without increasing costs and design complexity. In general, mutual coupling is to be avoided because it can change a desired radiation pattern of an antenna and its matching characteristics. Due to the reduced coupling, SIW antennas as described herein enable use of large bandwidths and preferred radiation patterns.

In some embodiments, the first electrically conducting means are configured as two walls that are flared in a direction perpendicular to the direction of extension, thereby forming a SIW horn antenna. Such embodiments include those where the first electrically conducting means comprise any of via holes, via posts and solid walls.

In some embodiments, the second electrically conducting means are configured as two parallel walls. Such embodiments include those embodiments where the second electrically conducting means comprise any of via holes, via posts and solid walls.

In some embodiments, at least a third metal plate and a fourth metal plate are arranged on the first side of the substrate and the second side of the substrate, respectively, beyond the aperture in the direction of extension. In some of these embodiments, the second electrically conducting means connect the third metal plate and the fourth metal plate.

In another aspect there is provided a SIW antenna array that comprises a plurality of SIW antennas according to the aspect summarized above. These SIW antennas are arranged adjacent each other, for example on a common substrate.

In another aspect there is provided a transceiver that comprises radio frequency transmission and reception circuitry, and at least one SIW antenna array according to the aspect summarized above.

These other aspects provide the same effects and advantages as summarized above in connection with the first aspect.

DETAILED DESCRIPTION OF EMBODIMENTS OF THE INVENTION

Figure 1:
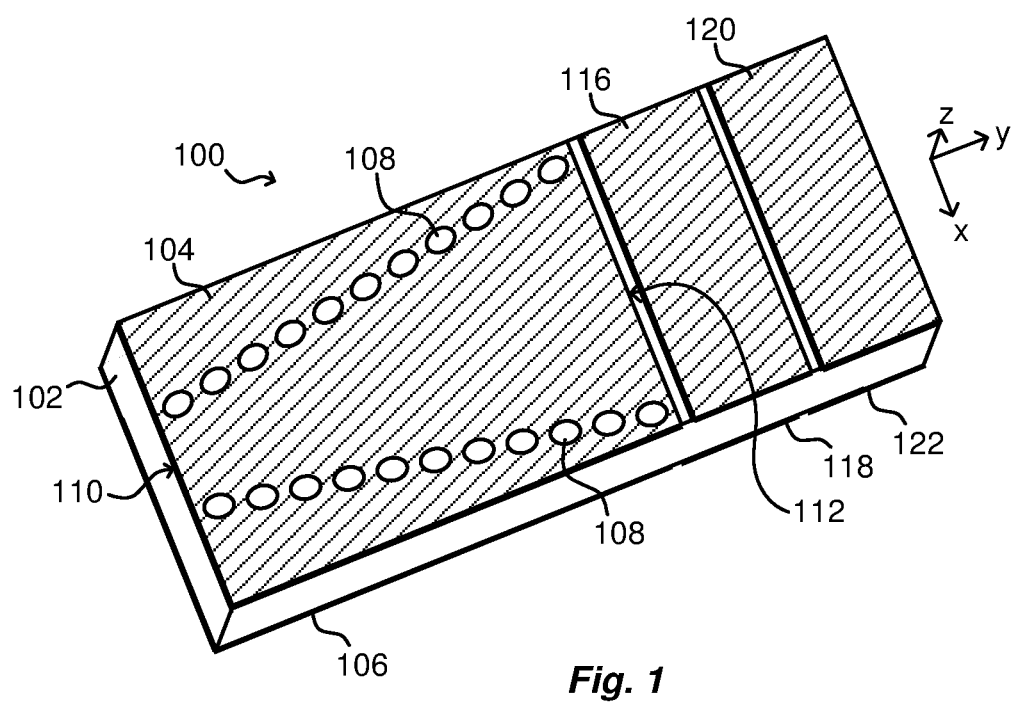
FIG. 1 schematically illustrates a prior art SIW antenna.
Figure 2A:
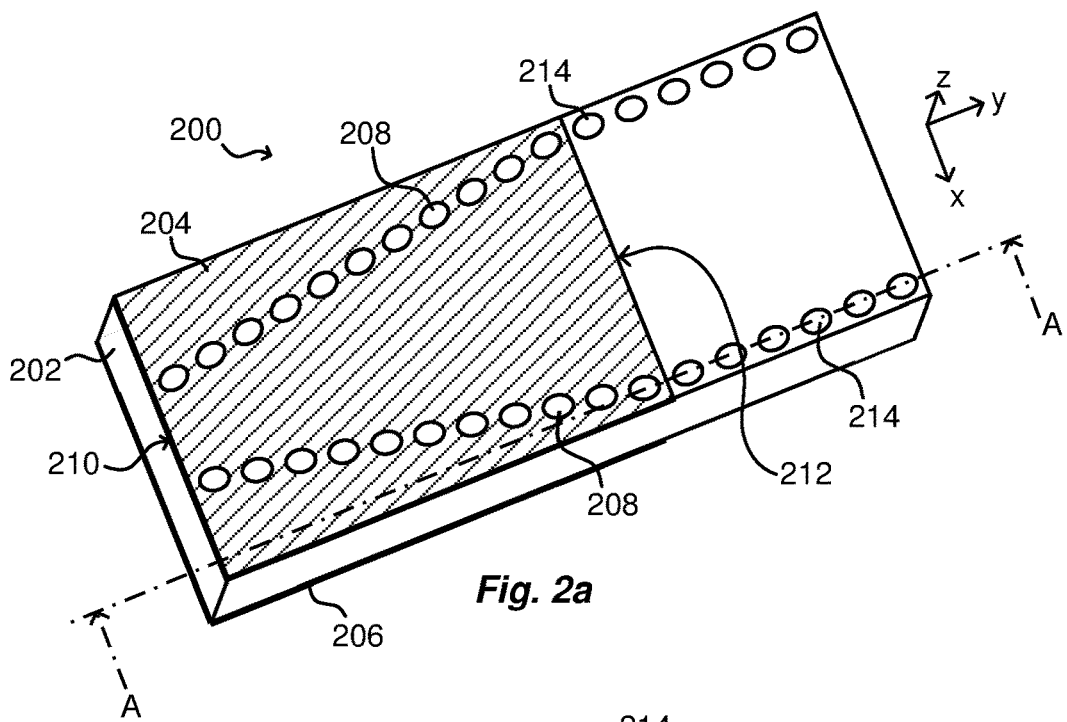
FIGS. 2a, 2b and 2c are schematically drawn perspective views of a SIW antenna.
Figure 2B:
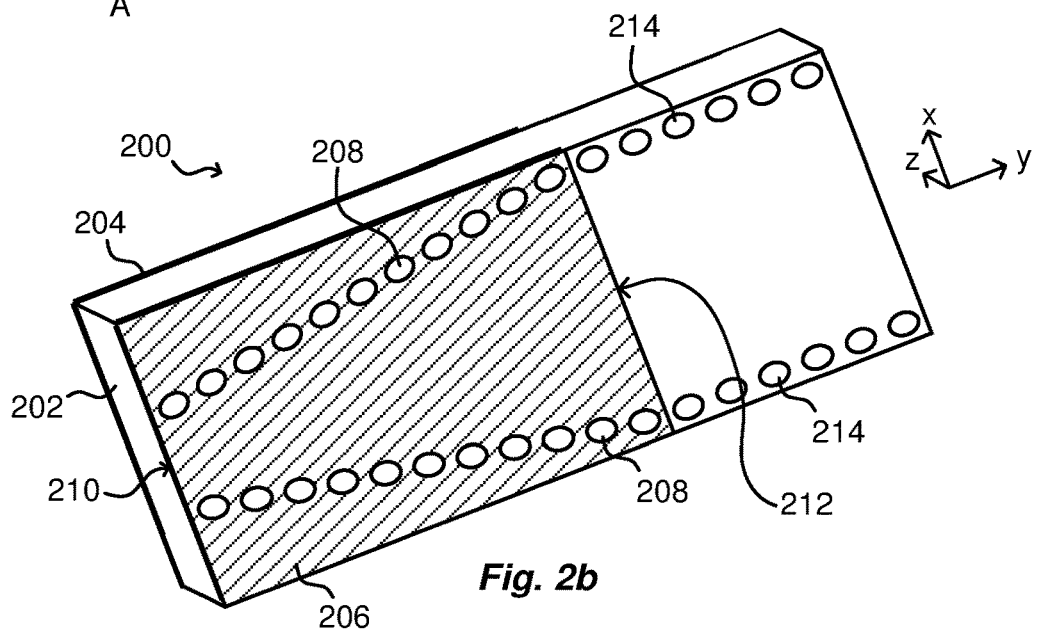
Figure 2C:
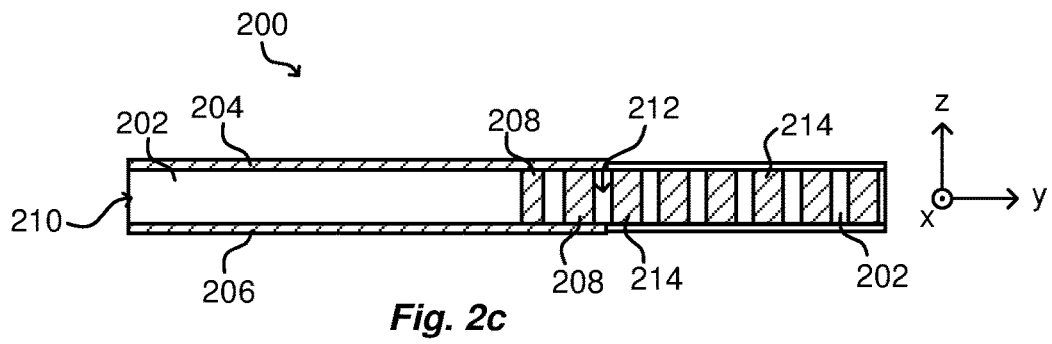

FIGS. 2a-2c illustrate a SIW antenna 200 from a respective viewpoint as indicated by a rectangular xyz coordinate system. FIG. 2a can be considered as a top view of the SIW antenna 200 and FIG. 2b may be considered as a bottom view of the SIW antenna 200. FIG. 2c is a schematically illustrated cross-section A-A along a direction of extension, y.

The SIW antenna 200 comprises a substrate 202, e.g. part of a PCB, a first metal plate 204 and a second metal plate 206 that are arranged on a respective first and second side of the substrate 202. First electrically conducting means 208, for example in the form of via holes or via posts, are arranged through the substrate 202 and connect the first and second metal plates 204, 206. Although not illustrated, the first electrically conducting means 208 may also be configured in the form of solid walls. The first electrically conducting means 208 are arranged in the direction of extension, y, starting at a feed end 210 and ending at an aperture 212.

Starting at the aperture 212, second electrically conducting means 214 are arranged through the substrate 202. The second electrically conducting means 214 are arranged in the direction of extension, y. As illustrated in FIGS. 2a-2c, the second electrically conducting means 214 may be configured as two parallel walls and, similar to the first electrically conducting means 208, they may for example be in the form of via holes or via posts or a solid wall.

As illustrated in FIGS. 2a-2c, the SIW antenna 200 exemplified here comprises first electrically conducting means 208 that are configured as two walls that are flared in a direction, x, perpendicular to the direction of extension, y, thereby forming a SIW horn antenna. Other spatial configurations in the xy-plane of the first electrically conducting means 208 are also possible. Although not illustrated in FIGS. 2a-2c, also the second electrically conducting means 214 may be configured in a more or less flared configuration in the xy-plane.

Figure 3:
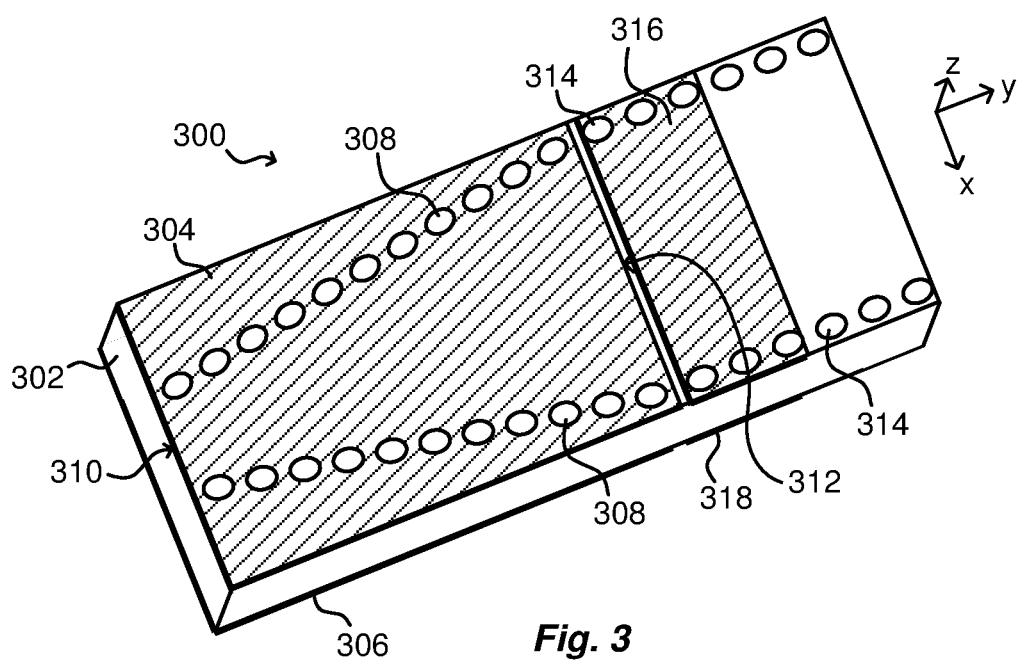
FIG. 3 is a schematically drawn perspective view of a SIW antenna.

Turning now to FIG. 3, another example of a SIW antenna 300 will be described. Similar to FIG. 2a described above, FIG. 3 is a perspective view of the SIW antenna 300, shown with reference to an xyz coordinate system.

The SIW antenna 300 comprises a substrate 302, e.g. part of a PCB, a first metal plate 304 and a second metal plate 306 that are arranged on a respective first and second side of the substrate 302. First electrically conducting means 308, for example in the form of via holes or via posts, are arranged through the substrate 302 and connect the first and second metal plates 304, 306. Although not illustrated, the first electrically conducting means 308 may also be configured in the form of solid walls. The first electrically conducting means 308 are arranged in the direction of extension, y, starting at a feed end 310 and ending at an aperture 312.

Starting at the aperture 312, second electrically conducting means 314 are arranged through the substrate 302. The second electrically conducting means 314 are arranged in the direction of extension, y. As illustrated in FIG. 3, the second electrically conducting means 314 may be configured as two parallel walls and, similar to the first electrically conducting means 308, they may for example be in the form of via holes or via posts or a solid wall.

As illustrated in FIG. 3, the SIW antenna 300 exemplified here comprises first electrically conducting means 308 that are configured as two walls that are flared in a direction, x, perpendicular to the direction of extension, y, thereby forming a SIW horn antenna. Other spatial configurations in the xy-plane of the first electrically conducting means 308 are also possible. Although not illustrated in FIG. 3, also the second electrically conducting means 314 may be configured in a more or less flared configuration in the xy-plane.

The SIW antenna 300 exemplified in FIG. 3 also comprises at least a third metal plate 316 and a fourth metal plate 318 arranged on the first side of the substrate 302 and the second side of the substrate 302, respectively, beyond the aperture 312 in the direction of extension, y. Here, the second electrically conducting means 314 connect the third metal plate 316 and the fourth metal plate 318. Alternatively (not shown in FIG. 3) the third and fourth metal plates 316, 318 may be configured with a smaller width in the x-direction such that the second electrically conducting means 314 do not connect the third and fourth metal plates 316, 318.

Figure 4:
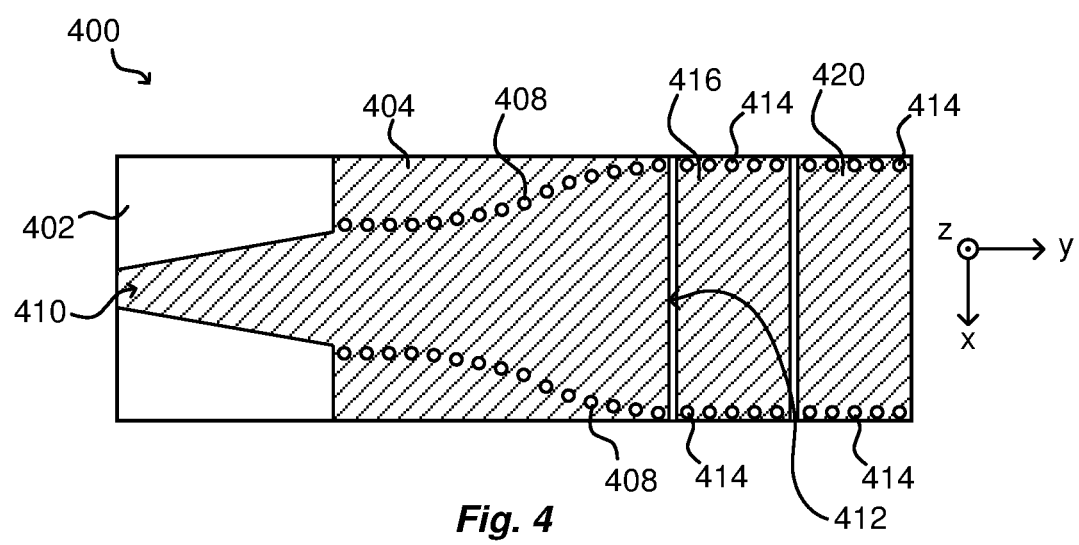
FIG. 4 is a schematically drawn top view of a SIW antenna.

Turning now to FIG. 4, yet another example of a SIW antenna 400 will be described. Unlike FIG. 3 described above, FIG. 4 is not a perspective view, but a top view of the SIW antenna 400 as indicated by the xyz-coordinate system.

The SIW antenna 400 comprises a substrate 402, e.g. part of a PCB, a first metal plate 404 that is arranged on a first side of the substrate 402. As the skilled person will realize, the SIW antenna 400 also comprises a second metal plate (not shown) on another side of the substrate 402, although this second metal plate is not illustrated in FIG. 4. First electrically conducting means 408, for example in the form of via holes or via posts, are arranged through the substrate 402 and connect the first metal plate 404 with the (not shown) second metal plate. Although not illustrated, the first electrically conducting means 408 may also be configured in the form of solid walls. The first electrically conducting means 408 are arranged in the direction of extension, y, starting at a feed end 410 and ending at an aperture 412.

Starting at the aperture 412, second electrically conducting means 414 are arranged through the substrate 402. The second electrically conducting means 414 are arranged in the direction of extension, y. As illustrated in FIG. 4, the second electrically conducting means 414 may be configured as two parallel walls and, similar to the first electrically conducting means 408, they may for example be in the form of via holes or via posts or a solid wall.

As illustrated in FIG. 4, the SIW antenna 400 exemplified here comprises first electrically conducting means 408 that are configured as two walls that are flared in a direction, x, perpendicular to the direction of extension, y, thereby forming a SIW horn antenna. Other spatial configurations in the xy-plane of the first electrically conducting means 408 are also possible. Although not illustrated in FIG. 4, also the second electrically conducting means 414 may be configured in a more or less flared configuration in the xy-plane.

The SIW antenna 400 exemplified in FIG. 4 also comprises at least a third metal plate 416 and a (not shown) fourth metal plate arranged on the first side of the substrate 402 and on the second side of the substrate (the second side not shown in FIG. 4), respectively, beyond the aperture 412 in the direction of extension, y. Furthermore, a fifth metal plate 420 is arranged on the first side of the substrate 402. A sixth metal plate (not shown in FIG. 4) is similarly arranged on the (not shown) second side of the substrate 402. Here, the second electrically conducting means 414 connect the third metal plate 416 and the (not shown) fourth metal plate as well as connect the fifth metal plate 420 and the (not shown) sixth metal plate. Alternatively (not shown in FIG. 4) the third, fourth, fifth and sixth metal plates may be configured with a smaller width in the x-direction such that the second electrically conducting means 414 do not connect these metal plates.

Figure 5:
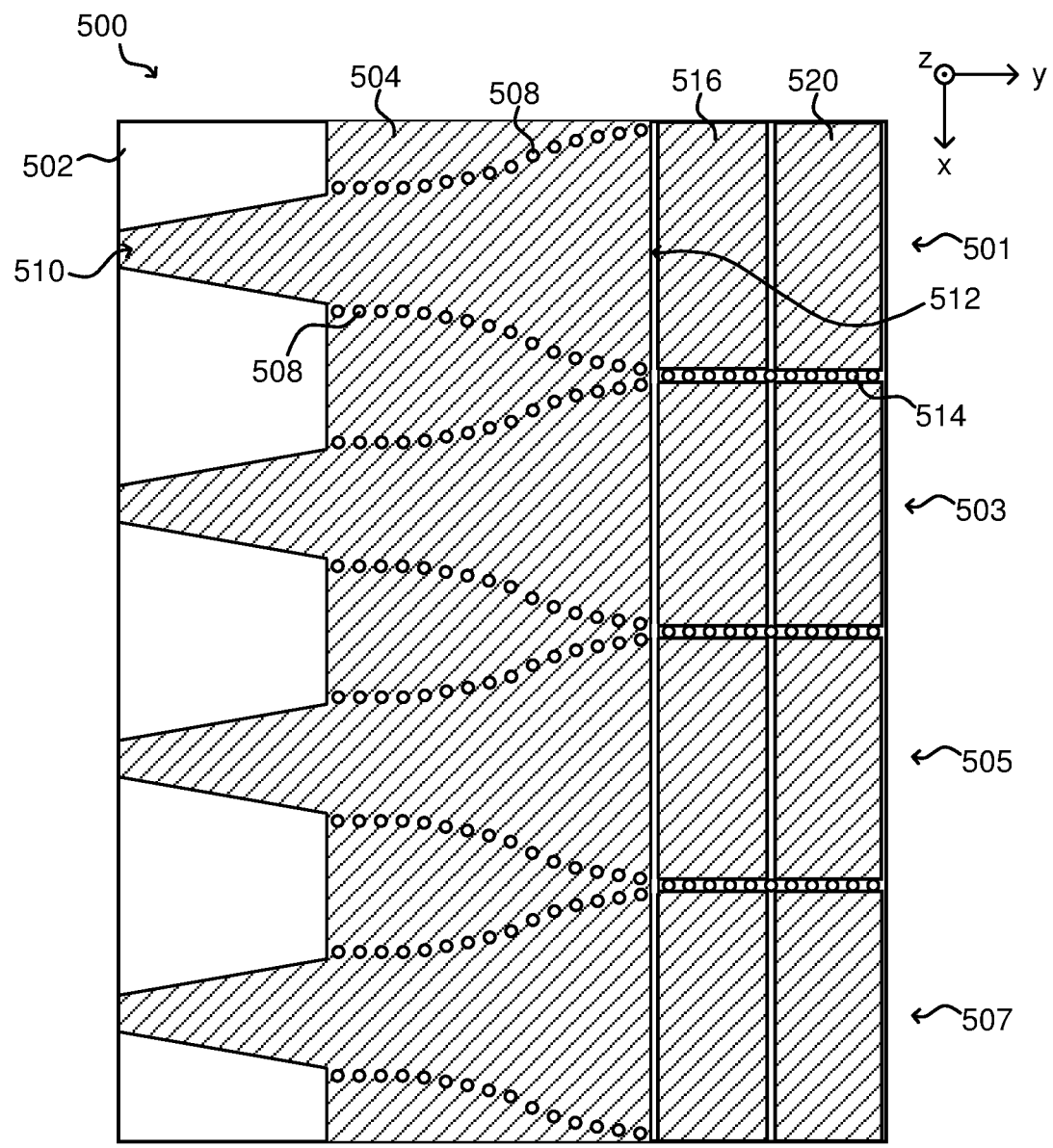
FIG. 5 is a schematically drawn top view of a SIW antenna array.

FIG. 5 is a top view of a SIW antenna array 500, also shown with reference to an xyz coordinate system. The SIW antenna array 500 comprises a plurality of SIW antennas such as any of the antennas described above. The specific example of the SIW antenna array 500 illustrated in FIG. 5 comprises four SIW antennas: a first SIW antenna 501, a second SIW antenna 503, a third SIW antenna 505 and a fourth SIW antenna 507 arranged adjacent each other.

As FIG. 5 shows, each of the SIW antennas 501, 503, 505, 507 are similar to the SIW antenna 400 described in connection with FIG. 4. The adjacent SIW antennas 501, 503, 505, 507 may, as exemplified in FIG. 5, be arranged on a common substrate 502. Other configurations may be such that each SIW antenna 501, 503, 505, 507 is arranged on a substrate of its own. Moreover, similar to the SIW antenna 400, each SIW antenna 501, 503, 505, 507 has a feed end 510, aperture 512, first metal plate 504, third metal plate 516 and fifth metal plate 520. First electrically conducting means 508 are also arranged in a fashion similar to that of the SIW antenna 400 in FIG. 4.

Second electrically conducting means 514 are arranged in the direction of extension, y, in a similar way as for the SIW antenna 400 in FIG. 4. However, since the SIW antennas 501, 503, 505, 507 are arranged adjacent each other, the second electrically conducting means 514 are shared between each adjacent pairs of SIW antennas. That is, the first SIW antenna 501 shares second electrically conducting means 514 with the second SIW antenna 503 and the second SIW antenna 503 shares second electrically conducting means 514 with the third SIW antenna 505 etc. As can be noted in FIG. 5, with respect to the first SIW antenna 501 and the fourth SIW antenna 507, there are no corresponding second electrically conducting means on their respective side that is not adjacent another SIW antenna in the array 500. However, alternative configurations of a SIW antenna array may comprise four, or any other appropriate plurality, of SIW antennas similar to SIW antenna 400, the second SIW antenna 503 and the third SIW antenna 505.

Implementations of the SIW antennas 200, 300, 400 and the SIW antenna array 500 described above are simple, both in terms of design and in terms of manufacturing, which in turn will mean no costs increase in the realization process. For example, in case the second electrically conducting means are in the form of vias, the vias dimensions and their separation can be chosen with the same conditions applied for the general SIW design (i.e. the vias should be close enough to each other as to emulate a metallic wall, and thereby avoid leakage of energy). The same applies to the substrate-air transition which can be made in different ways (e.g. in terms of additional metal plates) in order to provide the wanted bandwidth as far as the substrate is present.

Turning now to FIGS. 6, 7, 8a and 8b, results of simulations will illustrate the performance of a SIW antenna array, such as the SIW antenna array 500, in relation to the performance of prior art SIW antenna arrays.

Figure 6:
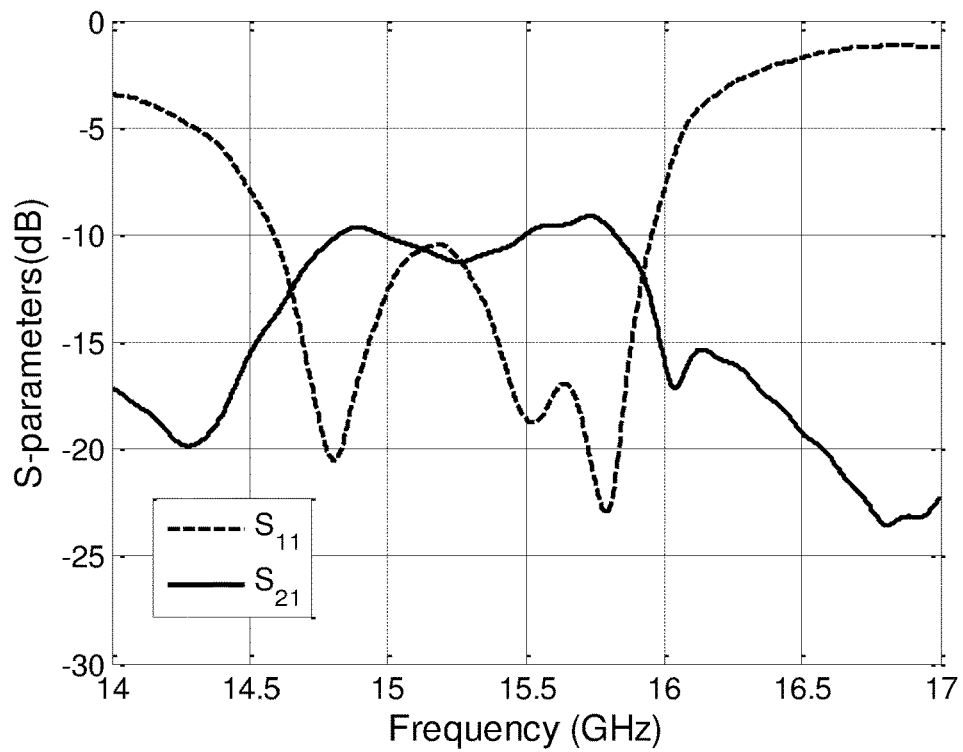
FIG. 6 is a graph illustrating S-parameters of a prior art SIW antenna array.

FIG. 6 shows simulation results of S-parameters (in dB) vs. Frequency (in GHz) for a prior art linear SIW H-plane horn array with 0.6 lambda antenna element spacing at 15 GHz. The SIW antenna array used in the simulations is similar to the SIW antenna array 500 described in connection with FIG. 5, but without second electrically conducting means 514 extending beyond the aperture 512.

The major contributor to mutual coupling is the adjacent antenna, i.e. a neighboring element, to the antenna element that is excited. These simulations involves exciting antenna 501, so the major effect on mutual coupling comes from the adjacent antenna, i.e. antenna 503. The S11 curve (dashed line) in FIG. 6 is the reflection coming from antenna 501 when this antenna is excited, and S21 (solid line) represents the amount of power from antenna 501 which is transmitted (lost) to antenna 503.

The results illustrated in FIG. 6 show that the worst mutual coupling value S21 is about −10 dB, which is coming from the neighbouring elements. This is not desirable because it indicates that a considerable amount of power is absorbed by the neighboring element rather than being radiated.

Figure 7:
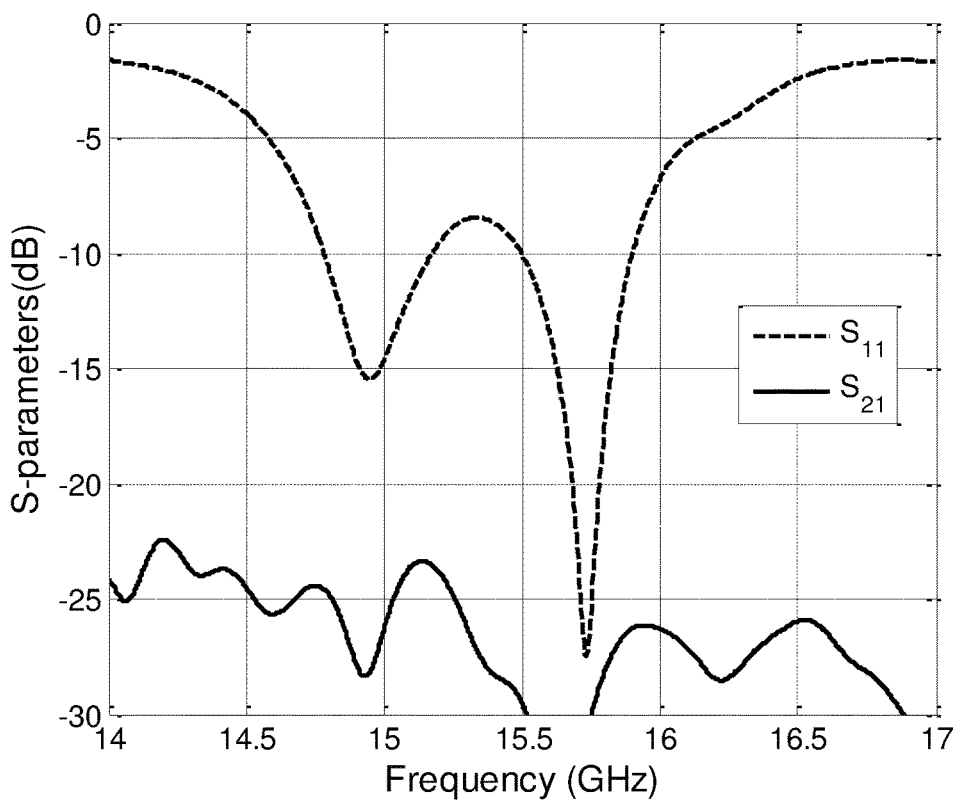
FIG. 7 is a graph illustrating S-parameters of a SIW antenna array.
Figure 8A:
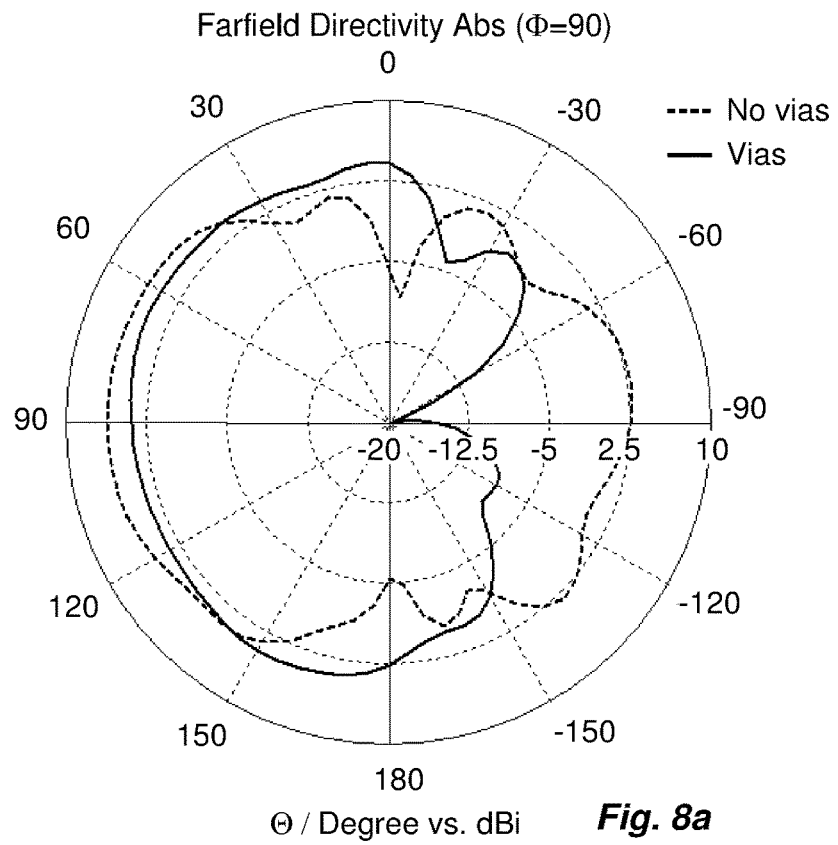
FIGS. 8a and 8b are graphs illustrating directivity of SIW antennas.
Figure 8B:
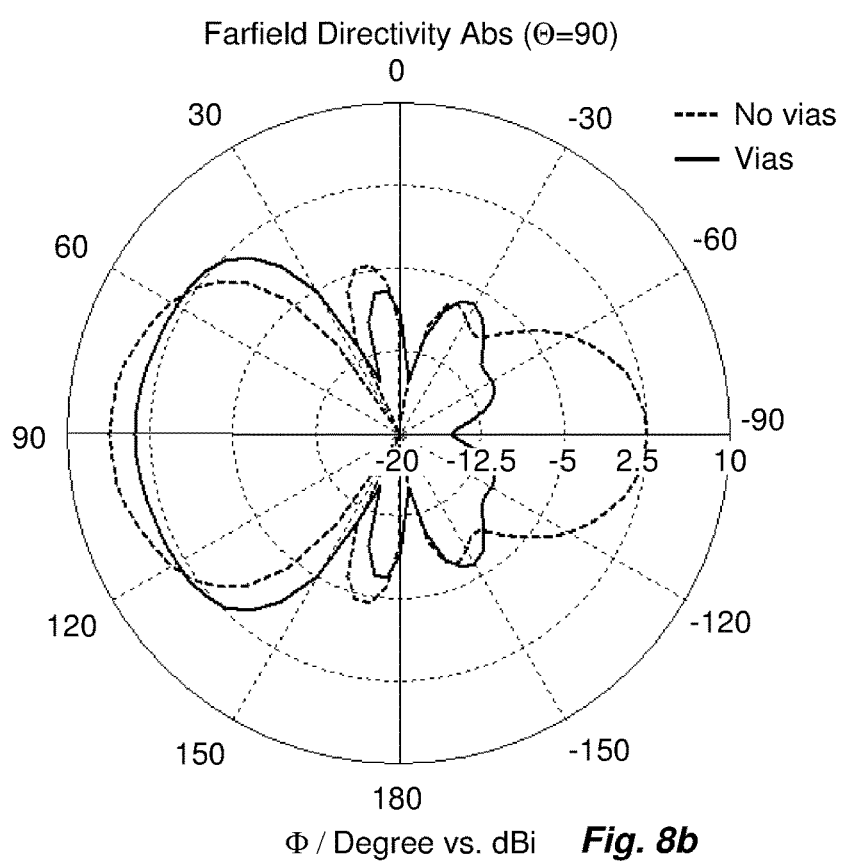

In contrast to the performance of the prior art SIW antenna array as shown in the graph of FIG. 6, FIG. 7 shows results of simulations for an improved SIW antenna array. The SIW antenna array used in the simulations is similar to the SIW antenna array 500 described in connection with FIG. 5, i.e. a linear SIW H-plane horn antenna array with 0.6 lambda antenna element spacing at 15 GHz that is configured with second electrically conducting means 514 extending beyond the aperture 512. The results illustrated in FIG. 7 show that the worst mutual coupling value (the solid line representing S21, shown relative to the S11 curve) is about −23 dB, which is a large improvement in relation to the prior art example shown in FIG. 6. That is, the performance of the SIW antenna array as indicated in FIG. 7 is improved in that only a relatively small amount of power is absorbed by the neighboring element rather than being radiated.

It has been found that the SIW antenna design as described above also provides a lower back radiation (i.e. amount of power wasted in the backward direction of the antenna). This applies for a single SIW antenna as well as for a SIW antenna array antenna implementation. Results from simulations of S-parameters in dB vs. Frequency in GHz illustrated in polar plots in FIG. 8a and FIG. 8b (Farfield Directivity Abs) show this reduced back radiation. The simulations were performed with a SIW antenna that is similar to the SIW antenna 400 described above. The radiation patterns in the polar plots clearly show the reduction of back radiation (along 90°) for an implementation having second electrically conducting means in the form of vias (shown in FIGS. 8a and 8b by solid lines) compared to a prior art SIW antenna array without vias (shown in FIGS. 8a and 8b by dashed lines).

Figure 9:
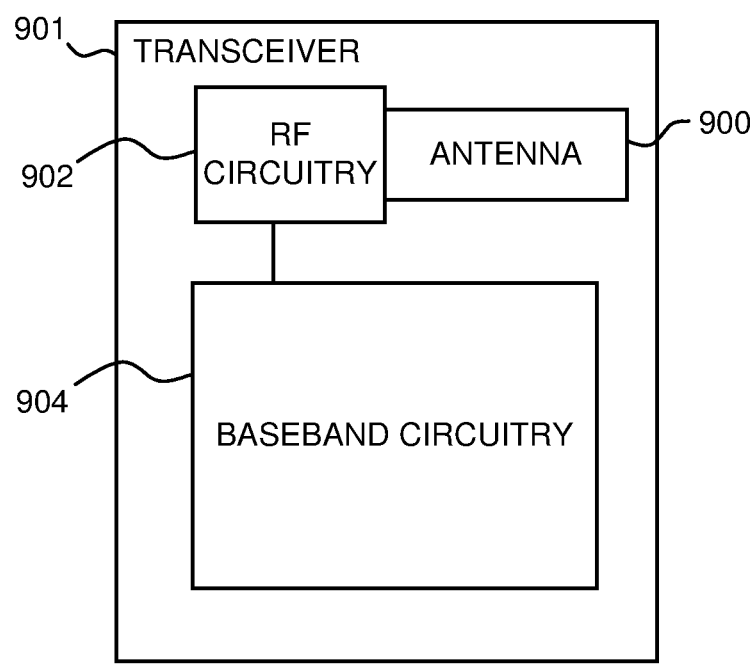
FIG. 9 is a schematically illustrated block diagram of a transceiver.

FIG. 9 illustrates a transceiver 901 that comprises baseband circuitry 904, radio frequency transmission and reception circuitry 902 and a SIW antenna array 900, similar to, e.g., the SIW antenna array 500 described above, connected to the radio frequency transmission and reception circuitry 902. Alternative implementations include those where the SIW antenna array 900 is replaced by a single SIW antenna similar to any of the SIW antennas 200, 300, 400 described above. Further implementations include those where the SIW antenna array 900 is replaced by a stack of SIW antenna arrays. Needless to say, the specific details regarding control and operation of the transceiver 901 is outside the scope of the present disclosure.

The invention claimed is:

1. A substrate integrated waveguide, SIW, antenna comprising:
   a substrate,
   a first metal plate arranged on a first side of the substrate,
   a second metal plate arranged on a second side of the substrate,
   first electrically conducting means arranged through the substrate to connect the first metal plate and the second metal plate, the first electrically conducting means being arranged along a direction of extension, starting at a feed end and ending at an aperture,
   second electrically conducting means arranged through the substrate, the second electrically conducting means starting at the aperture and being arranged along the direction of extension, and
   at least a third metal plate and a fourth metal plate arranged on the first side of the substrate and the second side of the substrate, respectively, beyond the aperture in the direction of extension,
   where the second electrically conducting means are configured as two parallel walls.

2. The SIW antenna of claim 1, where:
the first electrically conducting means are configured as two walls that are flared in a direction perpendicular to the direction of extension, thereby forming a SIW horn antenna.

3. The SIW antenna of claim 2, where:
the first electrically conducting means comprise any of via holes, via posts and solid walls.

4. The SIW antenna of claim 1, wherein the second electrically conducting means end at ends of the third metal plate and the fourth metal plate.

5. The SIW antenna of claim 1, where:
the second electrically conducting means comprise any of via holes, via posts and solid walls.

6. The SIW antenna of claim 1, wherein the second electrically conducting means end at an end of the substrate.

7. The SIW antenna of claim 1, where:
the second electrically conducting means connect the third metal plate and the fourth metal plate.

8. A transceiver comprising:
radio frequency transmission and reception circuitry, and
at least one SIW antenna array including:
   a plurality of SIW antennas arranged adjacent each other, wherein at least one of the plurality of SIW antennas includes:
   a substrate,
   a first metal plate arranged on a first side of the substrate,
   a second metal plate arranged on a second side of the substrate,
   first electrically conducting means arranged through the substrate to connect the first metal plate and the second metal plate, the first electrically conducting means being arranged along a direction of extension, starting at a feed end and ending at an aperture, and second electrically conducting means arranged through the substrate, the second electrically conducting means starting at the aperture and being arranged along the direction of extension,
   where the second electrically conducting means are configured as two parallel walls.

9. The transceiver of claim 8 where the plurality of SIW antennas are arranged adjacent each other on the substrate, the substrate being common to the plurality of SIW antennas.

* * * * *